F. B. MILLER.
VACUUM POT.
APPLICATION FILED JULY 31, 1911.
1,057,655.
Patented Apr. 1, 1913.
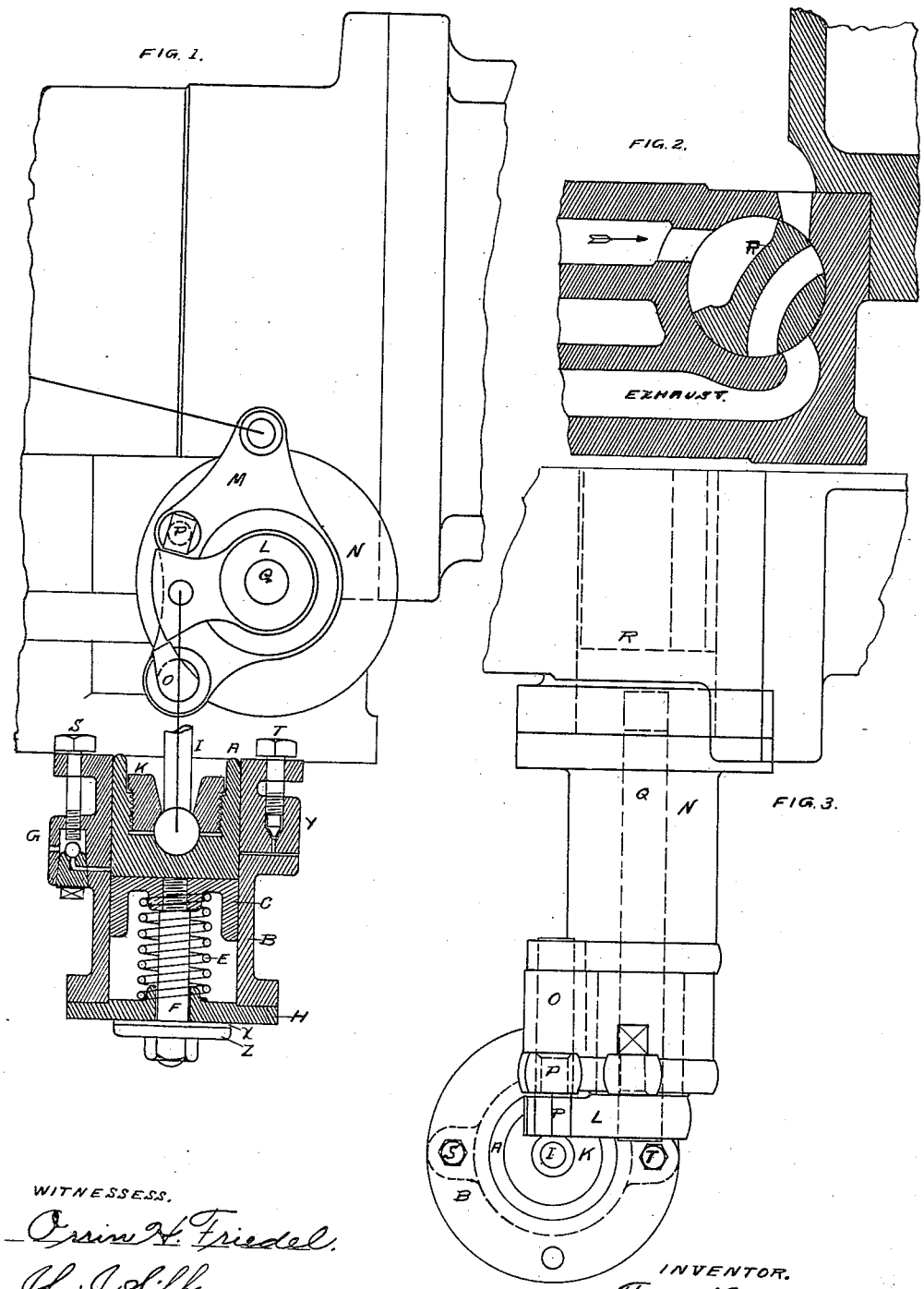

UNITED STATES PATENT OFFICE.

FREDERICK B. MILLER, OF MILWAUKEE, WISCONSIN.

VACUUM-POT.

1,057,655.  Specification of Letters Patent.  Patented Apr. 1, 1913.

Application filed July 31, 1911. Serial No. 641,685.

*To all whom it may concern:*

Be it known that I, FREDERICK B. MILLER, a citizen of the United States, residing at Milwaukee, in the county of Milwaukee and State of Wisconsin, have invented a new and useful Vacuum-Pot, of which the following is a specification.

My invention relates to improvements in vacuum pot mechanism adaptable for use with valve gearing, or in other use where vacuum pots are employed.

It is well known that the perfect operation of a vacuum pot, when connected with the valve mechanism of an engine will result in economy in the use of steam and more uniform speed of the engine.

When the load on engine is increased the vacuum pot plunger will rise in the cylinder and the vacuum will be much more efficient, and when the load on the engine is decreased the rise of the plunger will be comparatively slight, and on account of the short stroke of the said plunger the vacuum will be less efficient.

First. The object of my present invention is to afford a more efficient result from the vacuum in the vacuum pot cylinder under the plunger. Second. To form a better cushion in the vacuum pot cylinder under the plunger. Third. To have a vacuum pot which can be used on an engine where two Corliss valves are used as well as four Corliss valves.

With these objects in view the invention consists in certain novel features of construction and combinations of parts as hereinafter set forth, and pointed out in the claims.

The accompanying drawing illustrates an embodiment of my invention.

While my improvements are adaptable for use in any connection where vacuum pot mechanism may be employed, still for the sake of illustration I have shown, and will describe the invention as applied to the valve gear of an engine where two Corliss valves are employed.

Figure 1, is a side view of end of cylinder showing valve gear mechanism and section through my improved vacuum pot. Fig. 2, is a section through valve chest and steam passages. Fig. 3, is a top view of Fig. 1.

B. represents the vacuum pot cylinder, the upper portion of which receives the plunger A. The piston C. operating in the lower portion, the said piston being supported by the spring E. The stud F. with the washers X and Z can readily be understood, is fastened to the said piston and prevents the same from rising higher than the air passage leading to the check valve G., being held by washer H., which is fastened to the cylinder B. and supports the spring E. The vacuum pot plunger which operates in the upper portion of the said cylinder is connected by means of the rod I. with a lever L. of a valve gear, said lever being secured to the stem Q of a valve R. The valve gear also includes the bell crank M. adapted to be connected by means of a suitable rod with the wrist plate of the engine which reciprocates said bell crank on the bonnet N. and said bell crank also carries a hook pin O. to coöperate with the lever L. in effecting the operation of the valve.

From the construction and arrangement of parts described heretofore, it will be seen that when the plunger has risen and the hook pin O releases the lever L. the vacuum pot plunger will drop and the air which was taken in through the air valve Y. is discharged through check valve G. which can be readily understood, that the rush of air passing through the valve can be adjusted by means of the stem S. The piston C. which is supported by the spring E. is forced down more or less by the sudden drop of the plunger, according to the rise of the plunger as described heretofore, giving the air time to escape through the check valve G. as the said piston is pressed back in position by the spring E. thereby with my improved vacuum pot I avoid a jolt on the said plunger and obtain a more efficient vacuum under said plunger as the air valve Y can be adjusted with the stem T to diminish the amount of air taken in the said cylinder B. to suit the said spring E. which partly constitutes the cushion.

In the description heretofore set forth I have described the operation of the vacuum pot in which the valve has rotated on its seat, and the steam passages have opened to admit steam in the cylinder and closed. The lever L. then comes to a state of rest until in its backward movement the said bell crank M. which carries the pin P, comes in contact with the lever L. and carries it to the extreme limit of its travel. By this movement the valve is rotated upon its seat, and the exhaust port is opened. During this last described motion, the motion of the plunger A. is taken up by the said spring which supports the piston C. During the first part of the backward movement of the bell crank M. the exhaust port is closed, as it can be readily understood, that the spring E. which has been taken up during the movement, the exhaust port has opened, will press the plunger and connected mechanism back to the valves closed position.

The operation of the rear valve and its connected mechanism is the same as that just described.

Slight changes might be made in the detail construction of the vacuum pot without departing from the spirit of my invention limiting its scope, and hence I do not wish to restrict myself to the precise details shown and described.

Having fully described my invention, what I claim as new, and desire to secure by Letters-Patent is,—

1. In combination, an engine cylinder having a valve, a valve lever, a bell crank having a hook pin adapted to engage said lever to open said valve, a vacuum pot including a cylinder, plunger, and a piston exterior to said plunger, said plunger being connected to said lever and raised as said valve is opened producing a vacuum between said plunger and piston, means for disengaging said hook pin from said lever to permit said plunger to close said valve, a spring behind said piston which assists in cushioning said plunger, and a member adapted to engage said lever for opening said valve to exhaust and forcing said plunger and piston farther into the cylinder of the dash pot, said spring taking up the motion of said plunger and then returning said plunger to close said valve from exhaust position.

2. In combination, an engine cylinder having a valve, a vacuum pot including a cylinder, plunger, and piston exterior to said plunger, means to open said valve and to raise said plunger creating a vacuum under said plunger whereby the valve may be closed, and a spring tending to hold said piston in engagement with said plunger to cushion said plunger.

3. In combination, a valve, a vacuum pot having a cylinder, a plunger adapted to move therein to close said valve, and a spring-pressed piston exterior to said plunger and in said cylinder being adapted to assist in providing a cushioning effect for said plunger.

4. In combination, a valve, a vacuum pot having a cylinder, a plunger adapted to move in said cylinder to operate said valve, and a yieldingly mounted piston exterior to said plunger and in said cylinder adapted to assist in providing a cushioning effect for said plunger.

In testimony whereof, I have signed this specification in presence of two subscribing witnesses.

FRED. B. MILLER.

Witnesses:
ORRIN H. FRIEDEL,
JOHN J. SIKKENGA.

---

Copies of this patent may be obtained for five cents each, by addressing the "Commissioner of Patents, Washington, D. C."